ALBIN F. TURBAK
*INVENTOR.*

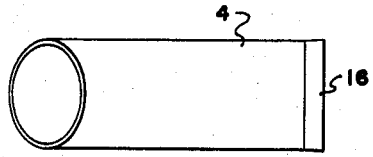
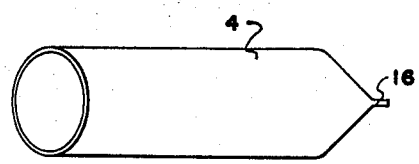
FIG. 5  FIG. 6
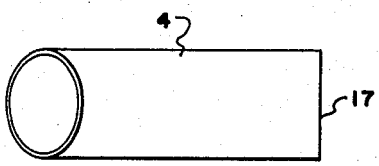
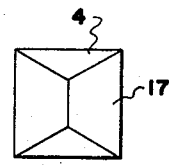
FIG. 7  FIG. 8
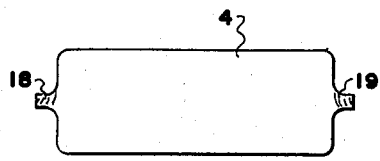
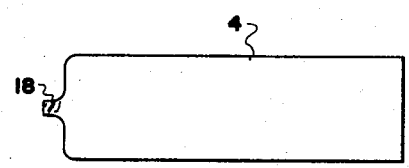
FIG. 9  FIG. 10

United States Patent Office 3,669,692
Patented June 13, 1972

3,669,692
WATER AND OXYGEN IMPERMEABLE COMMINUTED MEAT PRODUCT CASING
Albin F. Turbak, Danville, Ill., assignor to Tee-Pak, Inc.
Continuation-in-part of application Ser. No. 833,423, June 16, 1969, which is a continuation-in-part of application Ser. No. 518,116, Jan. 3, 1966. This application June 30, 1969, Ser. No. 865,541
The portion of the term of the patent subsequent to Feb. 2, 1988, has been disclaimed
Int. Cl. A22c 13/00; B32b 15/08
U.S. Cl. 99—176     2 Claims

ABSTRACT OF THE DISCLOSURE

A casing suitable for the encasing, processing, and storage of products, such as comminuted meat products requiring low oxygen and moisture permeability comprises a base foil member comprising metal foil, the base foil member being coated on opposite sides with a continuous layer of a thermoplastic, at least one layer of which thermoplastic is heat sealable, and folded and formed into a continuous tube having an adherent, stretch-resistant, longitudinally extending seam formed by heat sealing the thermoplastic layers at said seam.

CROSS-REFERENCE TO RELATED APPLICATION

Figure 1:
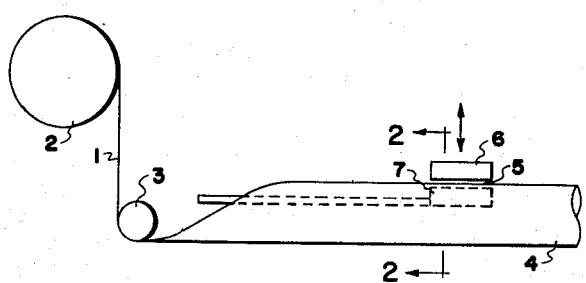

This application is a continuation-in-part of co-pending application Ser. No. 833,423, filed June 16, 1969, which in turn is a continuation-in-part application of application Ser. No. 518,116, filed Jan. 3, 1966, now abandoned.

DISCLOSURE OF THE INVENTION

This invention relates to new and useful improvements in casings, particularly for the meat industry, and more particularly to multi-ply casings having low moisture vapor transmission and low oxygen transmission rates. The invention is also related to improved methods for preparation of multi-ply casings.

In the processing (i.e., the manufacture, handling, storage, etc.) of certain easily spoilable and/or contaminable commodities, in particular foods such as pre-packaged whole, partially cut, or comminuted meat products, suitable results require the use of casings or packaging films having very low moisture vapor transmission and very low oxygen transmission rates. Such requirements have presented significant difficulties since the great majority of available packaging materials totally fail to qualify. Moreover, the problems in this area due to a dearth of suitable packaging material candidates often are complicated by the products desired to be packaged requiring special handling, processing, etc. (injection into the casing under pressure, cooking, sterilizing, etc.) which place still further demands on the packaging material.

Saran film (polyvinylidene chloride or polyvinylidene chloride copolymers), for example, has moisture vapor transmission and oxygen transmission characteristics which would be satisfactory for use in several applications which are especially demanding on packaging material permeability, e.g., in the preparation of liver sausage. As pointed out in U.S. Patent No. 2,961,323, however, Saran film has not performed entirely satisfactorily in preparation of liver sausages due to the fact that Saran casings become highly stretched when stuffed with liver sausage. This problem is further aggravated by the facts that, in liver sausage manufacture, as pointed out in U.S. Patent No. 2,866,710 and MacKenzie, Prepared Meat Product Manufacturing, 1964 (published by American Meat Institute Center for Continuing Education), pages 18, 19, and 58, the processing of the product necessarily involves a cooking step wherein the liver sausage filling of a stuffed casing has to be cooked in a bath of hot (e.g., 160–180° F.) to boiling (212° F.) water to an inside temperature of at least 148° F., usually on the order of 150° F., and that under these conditions the filling swells and exerts additional pressure on the casing. In liver sausage manufacture, accordingly, Saran casings have suffered from a difficulty in maintaining uniform size in the product. Some improvement in packaging characteristics has been obtained by the use of Saran coated cellulose tubing or casing for packaging of liver sausage. As U.S. Patent No. 2,961,323 mentioned hereinabove further points out, however, Saran coated cellulose casings, while less stretchable than unsupported Saran, nevertheless do stretch to an appreciable degree (e.g., 10%) during liver sausage stuffing and further processing with the result that even this improved casing has been subject to the disadvantage of uncertain quality and uniformity of product and high cost.

One of the objects of this invention is to provide a new and improved casing, especially for pre-packaged (e.g., comminuted meat products, characterized by low moisture vapor transmission and oxygen transmission rates.

Another object of this invention is the provision of an improved multi-ply casing for comminuted meat products which has strength and stretch characteristics making possible the packing of products of uniform dimensions therein.

Another object of this invention is to provide a new and improved multi-ply casing for use in the packaging and further processing of comminuted meat products.

A feature of this invention is the provision of a new and improved casing for comminuted meat products comprising a metal foil coated on opposite sides with a continuous layer of thermoplastics, at least one layer of which is heat sealable, and formed into a continuous tube having a heat sealed longitudinally extending lap joint.

Another feature of this invention is the provision of a new and improved water and oxygen impermeable casing suitable for encasing and further processing (e.g., cooking and/or storing) comminuted meat products wherein a metal foil coated on opposite sides with a continuous layer of thermoplastic, at least one layer of which is heat sealable, is formed into a continuous tube having a longitudinally extending seam which is then heat sealed.

Other objects and features of this invention will become apparent from time to time throughout the specification and claims as hereinafter related.

This invention is based upon the discovery that a new and improved casing which is substantially impermeable to oxygen and water vapor may be prepared by forming a metal foil, coated on opposite sides with a continuous layer of a film-forming thermoplastic, at least one layer being heat sealable, into a continuous tube having a longitudinally extending seam and heat sealing said seam. The casing which is thus produced is strong, has substantially complete impermeability toward water vapor and oxygen, and maintains a substantially constant diameter when stuffed with a comminuted meat product such as liver sausage or fresh ground beef and when the resultant stuffed sausage is cooked.

Figure 2:
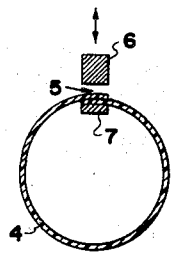
Figure 3:
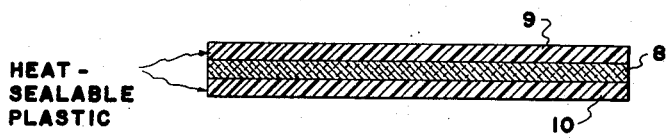
Figure 4:
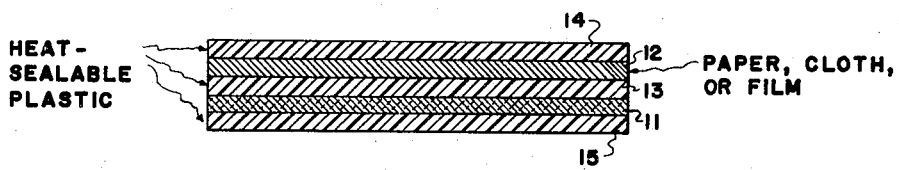

In the accompanying drawings to be taken as a part of this specification, there are clearly and fully illustrated several preferred embodiments of this invention, in which drawings, FIG. 1 is a diagrammatic representation of the process for forming a thermoplastic coated metal foil into a continuous multi-ply casing, FIG. 2 is a sectional view taken on the line 2—2 of FIG. 1, FIG. 3 is a view in section of a thermoplastic coated metal foil used in carrying out this invention, FIG. 4 is a view in section of another thermoplastic coated metal foil having paper, cloth or film laminated thereto for use in carrying out this invention, FIG. 5 is an isometric view of a casing formed in accordance with the process illustrated in FIG. 1 and heat sealed across one end, FIG. 6 is a plan view of the casing shown in FIG. 5, FIG. 7 is an isometric view of a casing formed in accordance with the process illustrated in FIG. 1 and having a folded and heat sealed end portion, FIG. 8 is a view in right elevation of the casing shown in FIG. 7, FIG. 9 is a view in elevation of a casing formed in accordance with the process illustrated in FIG. 1, stuffed with a meat product and having its ends closed by a twisted and clipped closure, and FIG. 10 is a view in elevation of the casing shown in FIGS. 7 and 8 when stuffed and clipped with a comminuted meat product and closed by a twisted end closure.

Referring to the drawings by numerals of the reference and more particularly to FIGS. 1 and 2, there is shown diagrammatically the process of preparing a novel multiply meat casing. In FIG. 1, a plastic coated metal foil 1 is fed from a feed roll 2 past a guide roll 3 and formed into an elongated tube 4 of indefinite length. The foil 1 is formed into tube 4 by folding foil 1 to form a joint such as lap joint 5, as shown in FIGS. 1 and 2. Lap joint 5 is formed into a heat sealed lap joint by heat sealer bar 6 which reciprocates vertically and presses against forming shoe 7.

The plastic coated foil used in the preparation of casing as shown in FIGS. 1 and 2 is preferably a base foil member comprising a thin gauge metal foil such as aluminum foil and double-face-coated (i.e., having a coating on opposite sides) with a film-forming heat sealable thermoplastic material. The base foil member which is used is preferably one which is thick enough to provide a substantially complete oxygen and moisture vapor barrier. A cross section of a typical over-all foil is shown in FIG. 3 wherein there is shown a metal foil 8 having thermoplastic coatings 9 and 10 on opposite sides thereof. The metal foil of the laminate may be as thin as 0.00035 in. and may range in thickness up to 0.01 in. depending upon the strength desired in the coated foil. The thermoplastic coatings 9 or 10 may be adherently applied to the base foil member in the form of melt-extruded coatings or may be films which are preformed and the base foil member laminated to the film or may be applied in the form of a solution, dispersion, latex, emulsion, etc., and dried to form an adherent coating of the desired thickness and consistency. The coatings 9 and 10 are preferably both of a heat sealable plastic material, although one of the coatings may be heat sealable and the other not heat sealable, provided that the two coatings, when folded and brought together in a face-to-face joint and are heat sealed, form an adherent, essentially non-stretchable bond.

As is apparent from the disclosed use of the multi-ply casing materials, the film coatings 9 and 10 of specific embodiments of the casing, of course, must retain a self-supporting, stretch-resistant character under the conditions to which the particular packaged contents of a given casing are subjected during processing. The films, for example, typically are stretch-resistant at temperatures ranging up to a maximum which is at least in the range of from about 160° F. to about 212° F. in the case of casings used for packaging comminuted meats such as liver sausage which must be cooked and at temperatures ranging up to at least about 212° F. in the case of casings used for packaging certain foods which can be heated and sterilized in situ.

Typical film-forming, heat sealable thermoplastic which may be applied to the metal foil include rubber hydrochloride, polyvinyl chloride, polyvinyl acetate, polyvinylidene chloride, polystyrene, polyethylene, or copolymers thereof. Films which are not ordinarily considered heat sealable but which may be used for one of the coatings on the foil include polypropylene and polyesters. As is known, embodiments of the above-disclosed and other film-forming thermoplastics are available and, hence, can be selected for use in the present invention which retain their stretch-resistance at temperatures ranging up to and over 650° F.

In FIG. 4, there is shown a cross section of a coated foil wherein the base foil member is a metal foil having a paper, cloth or plastic film suitably coated (with or without an adhesive) therewith and the base foil member is provided with a heat sealable coating on opposite sides. In FIG. 4, in the base foil member the metal foil 11 has a layer of paper, cloth or plastic film 12 laminated and adhered thereto through use of an adhesive film (e.g., heat sealable film) 13. Thermoplastic film layers 14 and 15 are applied over the paper, cloth or film layer 12 and to the underside of the metal foil 11. The laminate which is shown in FIG. 4 is used to form continuous heat sealed tubes as illustrated in FIGS. 1 and 2. The tubes are preferably formed with the paper, cloth, or film layer positioned on the outside of the tube or casing. The tube or casing which is thus formed has an inner layer 15 of plastic which protects the contents of the tube from contact with the metal foil. The paper, cloth, or film layer 12 on the outside of the tube is provided for a decorative effect. The paper, cloth, or film layer 12 may be dyed or pigmented prior to lamination to the foil 11 so that the resulting product may have any desired color or pattern, including printing or decorative patterns.

In the foil laminates, as shown in FIGS. 3 and 4, the foil may range from 0.00035 to 0.01 in. in thickness. The thermoplastic, heat sealable coating on the metal foil may range from 0.00001 to 0.01 in. in thickness on each side of the metal foil and is preferably of a thickness in the range from 0.0002 to 0.004 in. in thickness. The thickness of the heat sealable thermoplastic coating on each side of the metal foil is determined largely by the desired properties of strength and resistance to stretch desired in the finished product. The combination of a thin metal foil with a thermoplastic coating on opposite sides provides a product which is easily fabricated by heat sealing and which has a relatively high strength and substantially no stretch. The casing which is prepared as described above can be tightly stuffed with a comminuted meat product, such as ground beef or liver sausage, and, where desired, the meat filling then cooked to produce a packaged product having very accurately defined dimensions. The substantially complete resistance to stretching during stuffing and processing (e.g., cooking) results in a finished meat product which is accurately predictable in size. This feature, coupled with the substantially complete resistance of the casing to oxygen and moisture vapor transmission, makes the casing superior to essentially all commercial products for the packaging of meat products which are sensitive to oxygen or to transmission of moisture, e.g., ground beef and liver sausage.

In FIG. 5 there is shown an isometric view of a heat sealed tube or casing 4 prepared as described in FIGS. 1 and 2. The end of the casing is closed by simply flattening the casing and forming a heat seal diametrically across the casing as shown at 16 in FIGS. 5 and 6.

In FIGS. 7 and 8 there are shown views of a casing 4 having an end closure 17 formed by folding the end of the casing in a manner substantially the same as the fold used to close the bottom of a paper bag followed by application of heat to the closed end to heat seal the end of the casing.

In FIG. 9 a portion of casing 4 is shown in the form in which it would appear when stuffed with a meat product and its ends closed by twisting and clipping as indicated at 18 and 19. Similarly the casing shown in FIGS. 5 and 6 could be stuffed with product and the open end twisted and clipped closed as illustrated at 18 in FIG. 9. In FIG. 10 the casing shown in FIGS. 7 and 8 is illustrated in the form that it would appear when stuffed with a meat product and the open end closed by twisting and clipping as indicated at 18.

The following nonlimiting examples are illustrative of the scope of this invention:

Example 1

A 1 mil aluminum foil having a two-tenths mil coating of polyvinyl chloride on each side is formed into a 3 in. diameter tube with a lap seam as illustrated in FIGS. 1 and 2. The lap seam is heat sealed as previously described. The plastic coated foil casing which is thus produced was stuffed with liver sausage and the ends sealed by twisting and clipping as illustrated in FIG. 9. The sausage is then cooked in a water bath at 165° F. to an internal temperature of 150° F. and then held in the bath for an additional 30 minutes. The resultant product which has retained its physical integrity during the cooking treatment then is stored at 35–40° F. and 50–55% relative humidity for extended periods and periodically observed for changes.

The test reveals the sausage is quite stable. Even after three or four weeks' storage, for example, the stored sausage displays substantially no loss in weight and no indication of brown ring formation. Liver sausage encased in regenerated cellulose casing or fibrous reinforced cellulose casing would have a loss in weight of about 15% after storage under the same conditions.

Example 2

A paper-aluminum (2 mil/1 mil) foil laminate coated with three-tenths mil of polyethylene, as illustrated in FIG. 4, is formed into a casing with a heat sealed longitudinally extending lap joint as illustrated in FIGS. 1 and 2. When the casing is stuffed and processed, as in Example 1, with liver sausage there is essentially no breakage and sausages are produced which are absolutely uniform in diameter and stable during storage.

The paper-foil laminated casing is especially useful where decorative product packaging is desired. The paper may be dyed or otherwis colored or printed before the final coating is applied to the paper-foil laminate so that the finished product will have suitable coloring or printing or decorations as desired. When paper-foil laminates are used, it is preferred to use a paper which has been treated with a wet strength additive, e.g., melamine-formaldehyde resin, regenerated cellulose, etc., so that the paper is not weakened if the foil or casing prepared from the foil is exposed to water under conditions where wicking may occur. It should also be noted that similar decorative effects may be obtained in the preparation of laminated foil casings by using cloth, or plastic film (including regenerated cellulose film) suitably laminated to the metal foil as described above. Such cloth or film may be dyed, pigmented, or printed prior to application of the thermoplastic coating to the laminate.

While the use of the plastic coated foil casing has been described primarily with reference to the packaging of comminuted meats, such as liver sausage and fresh ground beef, it should be noted that this casing, because of its substantially complete resistance to transmission of moisture vapor and oxygen, also may be used for the packaging and further processing of not only other foods and non-foods which require or are more suitably adopted for packaging in films having low gas transmission and low moisture vapor transmission, but others where the low gas transmission and low moisture vapor transmission rates of the casing are not detrimental.

While this invention has been described fully and completely with special emphasis upon several preferred embodiments thereof, it should be understood that within the scope of the appended claims the invention may be practiced otherwise than as specifically described herein.

What is claimed is:

1. A comminuted meat product casing for packaging and/or processing, comprising a single base foil member coated on opposite sides with a continuous layer of a thickness in the range of from 0.0001 to 0.01 of a thermoplastic material comprising rubber hydrochloride, polyvinyl chloride, polyvinylidene chloride, polystyrene, polyethylene, or polyvinyl acetate, or copolymers thereof, which forms films having resistance to stretch and delamination at temperatures from about 160° F. to about 212° F. to which said packaged product in said casing may be subjected for processing, said base foil member comprising aluminum foil having substantially complete impermeability to oxygen and water vapor and a thickness ranging from about 0.00035 to 0.01 inch, said thermoplastic layers on opposite sides of said base foil member, when brought together in a joint, being heat sealable together into an adherent seam having substantially complete resistance to stretch and delamination at temperatures of about 160° F. to about 212° F., said coated foil being folded and the longitudinally extending edges overlapped in a narrow lap seam with the thermoplastic layers at the resultant seam being heat sealed together to form a continuous flexible tube having an adherent heat-sealed, longitudinally extending seam and having substantially complete resistance to stretch and delamination under conditions of packaging and processing.

2. The casing as defined in claim 1 wherein the base foil member comprises said aluminum foil having a layer of paper, cloth, or plastic film adhesively laminated thereto.

References Cited

UNITED STATES PATENTS

| | | | |
|---|---|---|---|
| 2,778,760 | 1/1957 | Hurst | 99—176 |
| 2,898,233 | 8/1959 | Hmiel | 117—103 |
| 2,902,396 | 9/1959 | Reynolds | 99—171 |
| 2,961,323 | 11/1960 | Underwood | 99—176 |
| 2,982,457 | 5/1961 | D'Alelio | 229—3.5 |
| 3,233,815 | 2/1966 | Egeen | 99—171 |
| 3,445,055 | 5/1969 | Port | 99—171 |
| 2,773,773 | 12/1956 | Narder | 99—176 |
| 2,604,423 | 10/1944 | Slotterbeck | 161—216 X |
| 3,343,663 | 9/1967 | Seidler | 161—216 X |
| 3,480,464 | 11/1969 | Lacy | 161—216 X |

FOREIGN PATENTS

| | | | |
|---|---|---|---|
| 290,384 | 11/1931 | Italy | 99—171 |

FRANK W. LUTTER, Primary Examiner

R. HALPER, Assistant Examiner

U.S. Cl. X.R.

206—40 F; 229—3.5; 161—216; 99—171 LP